United States Patent Office 3,273,300
Patented Sept. 20, 1966

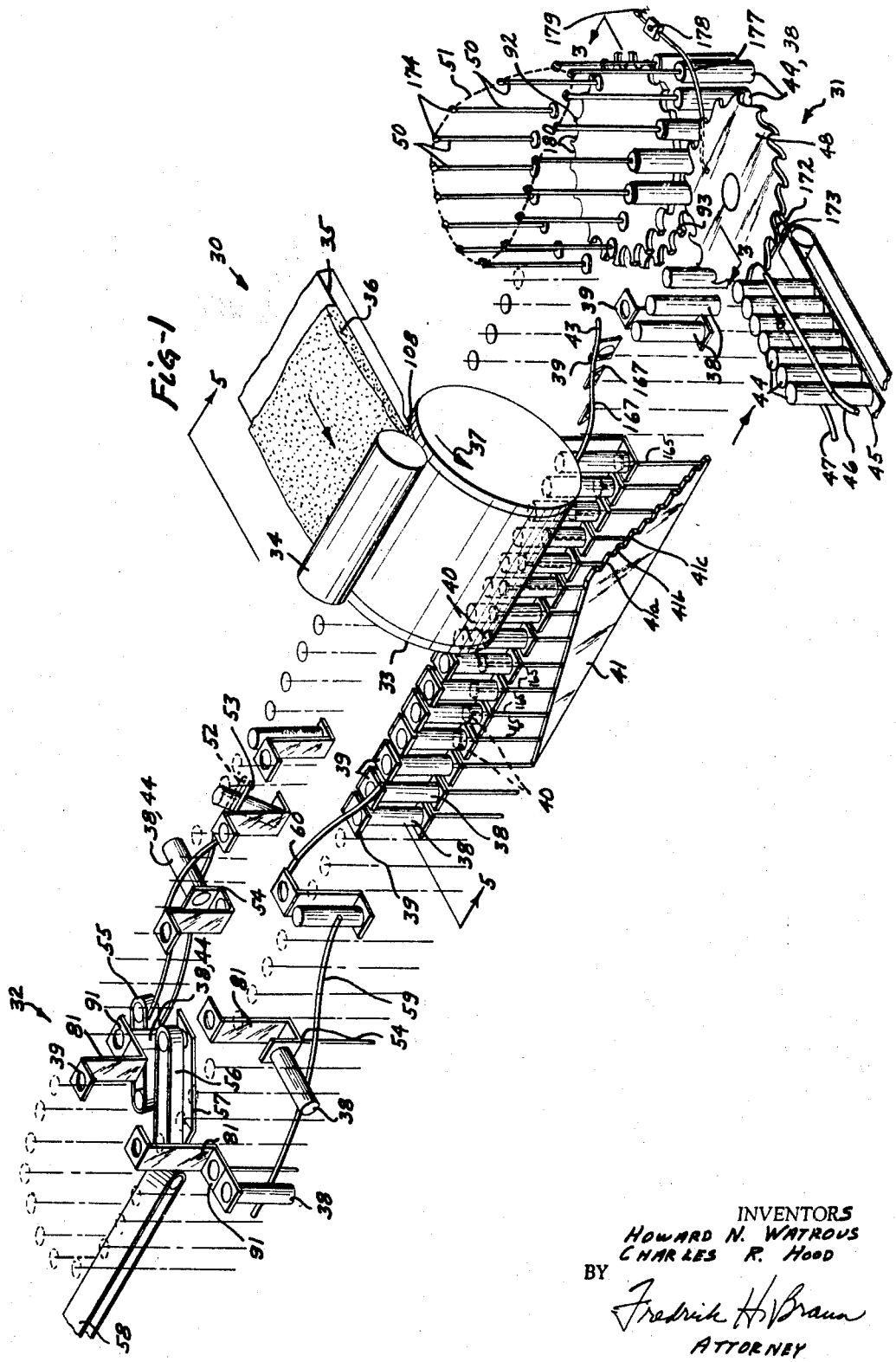

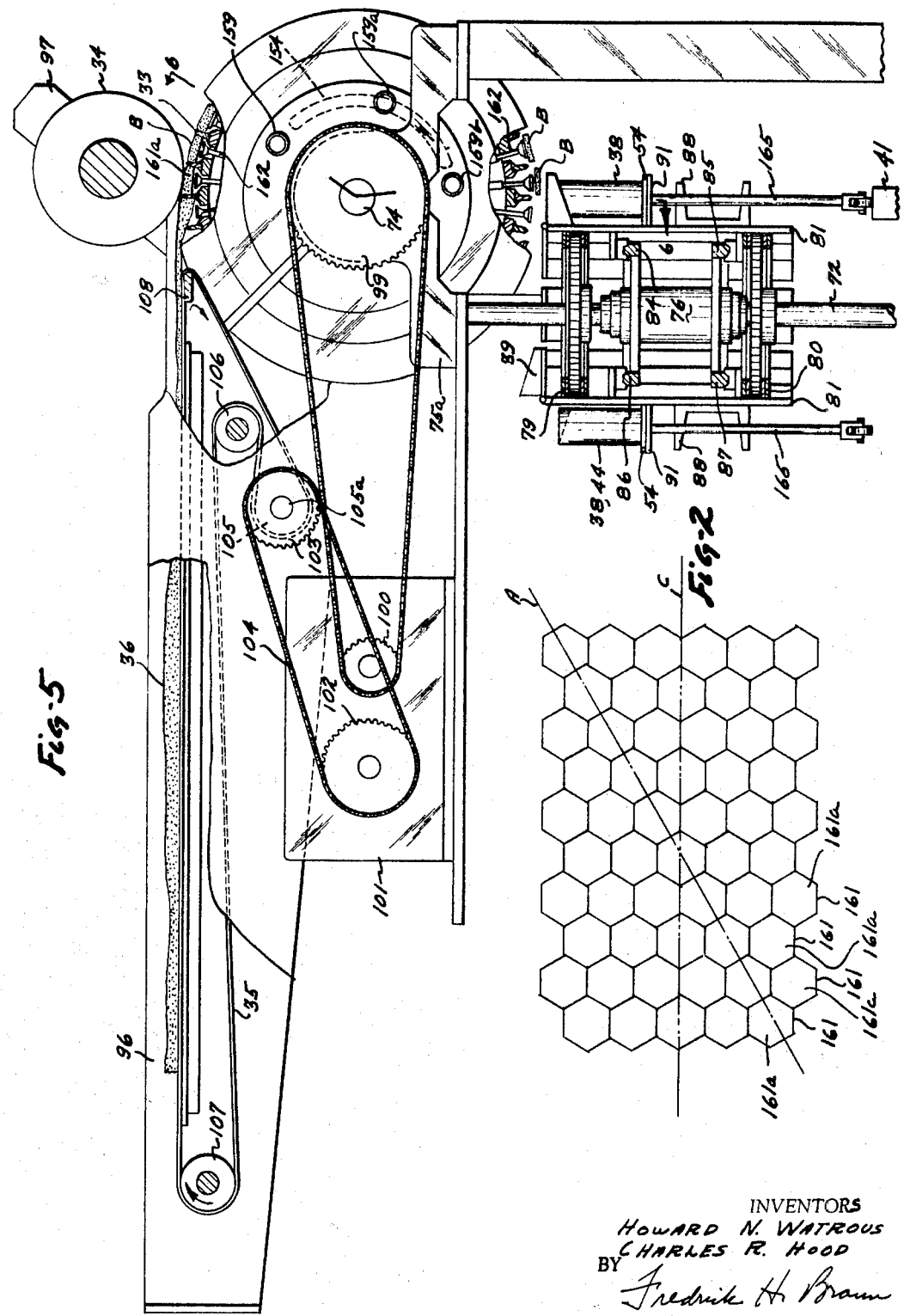

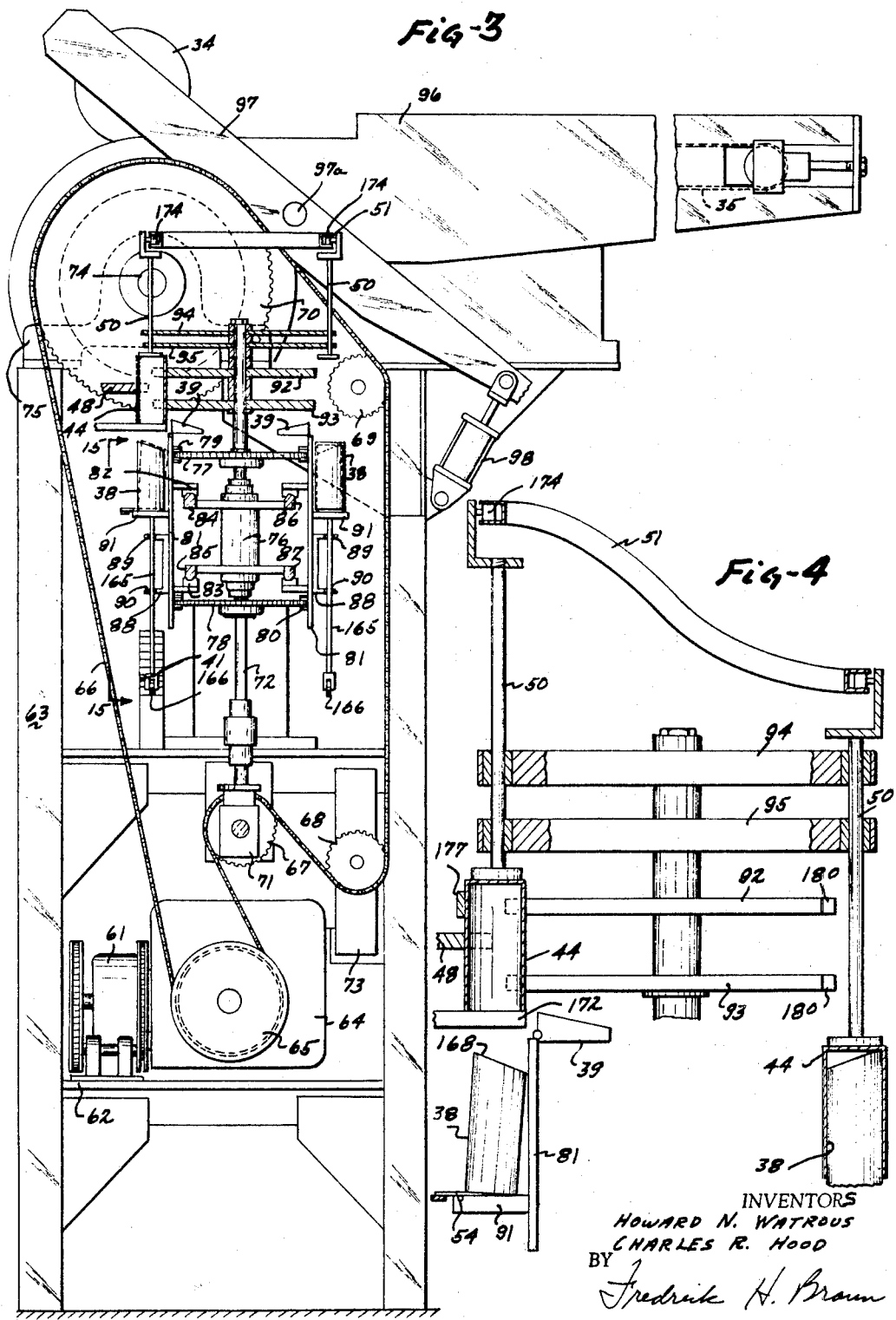

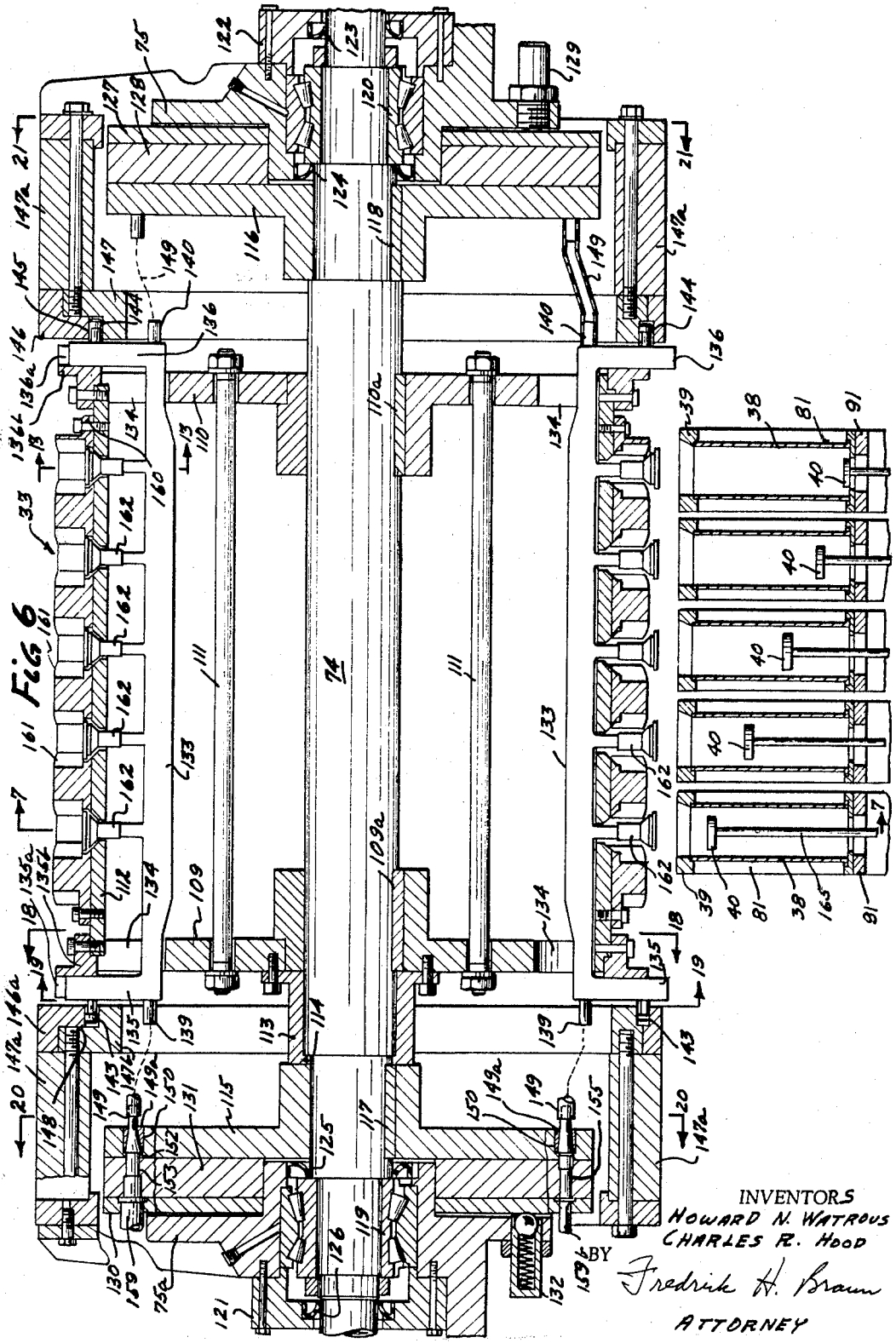

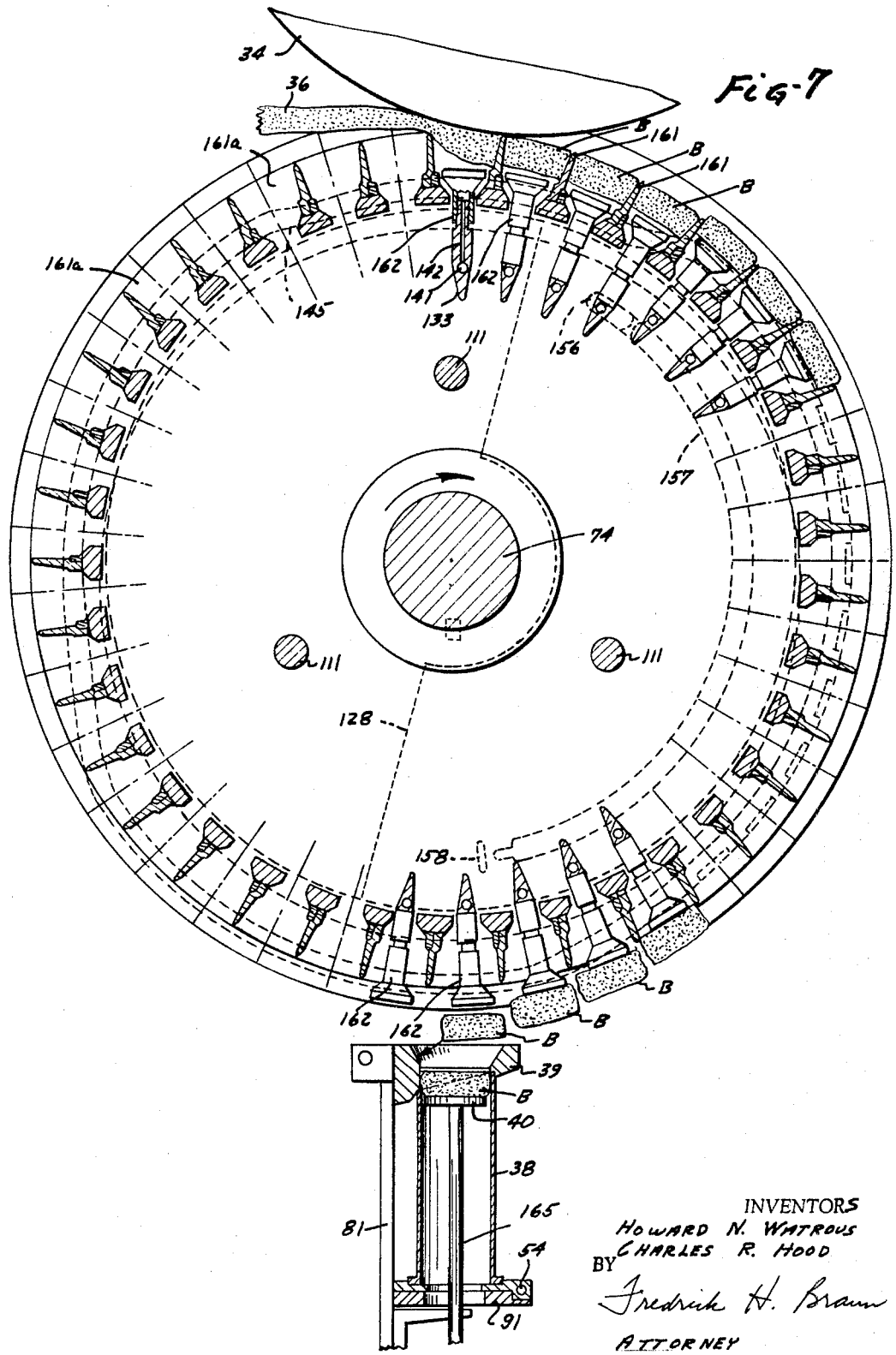

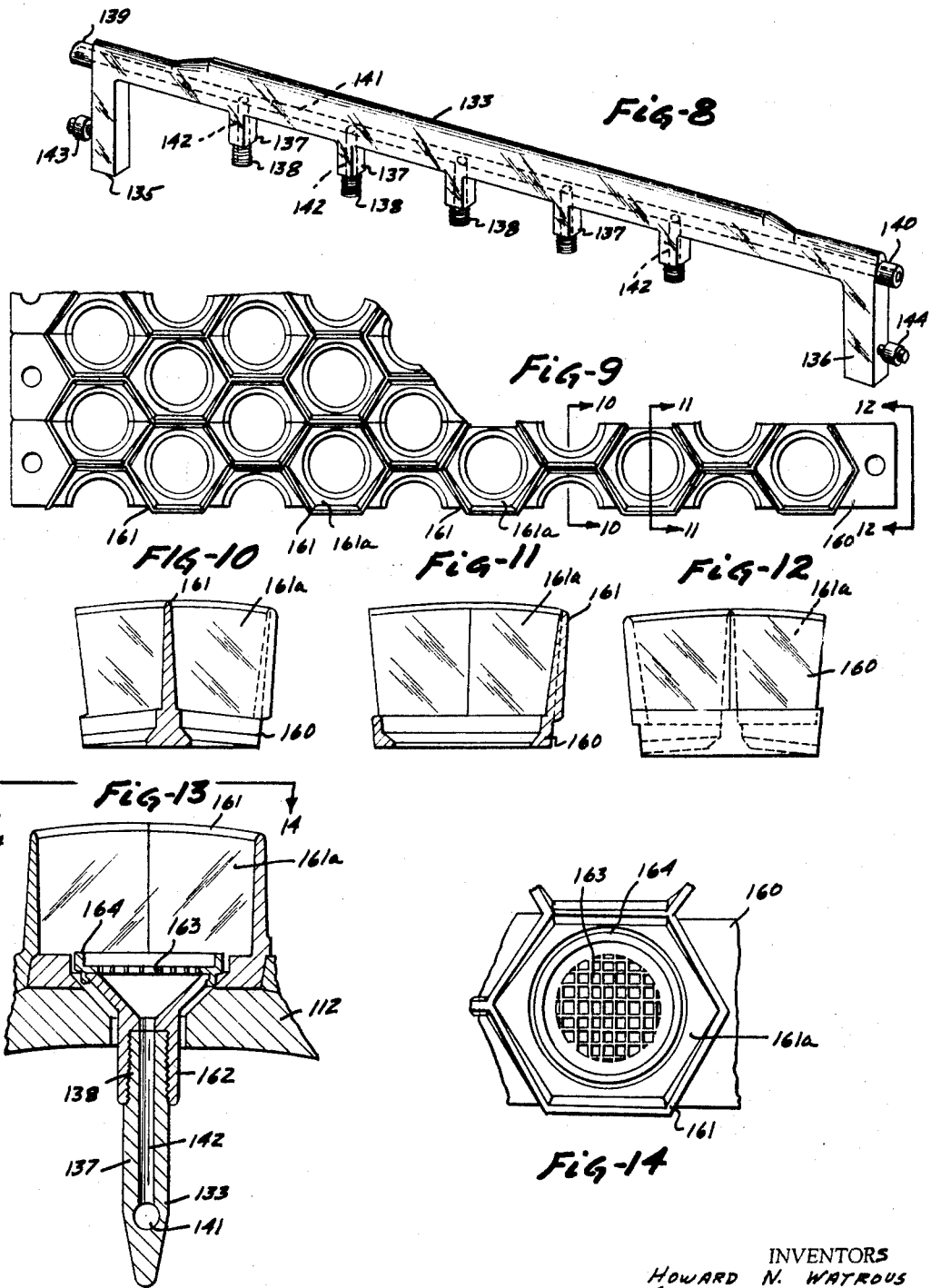

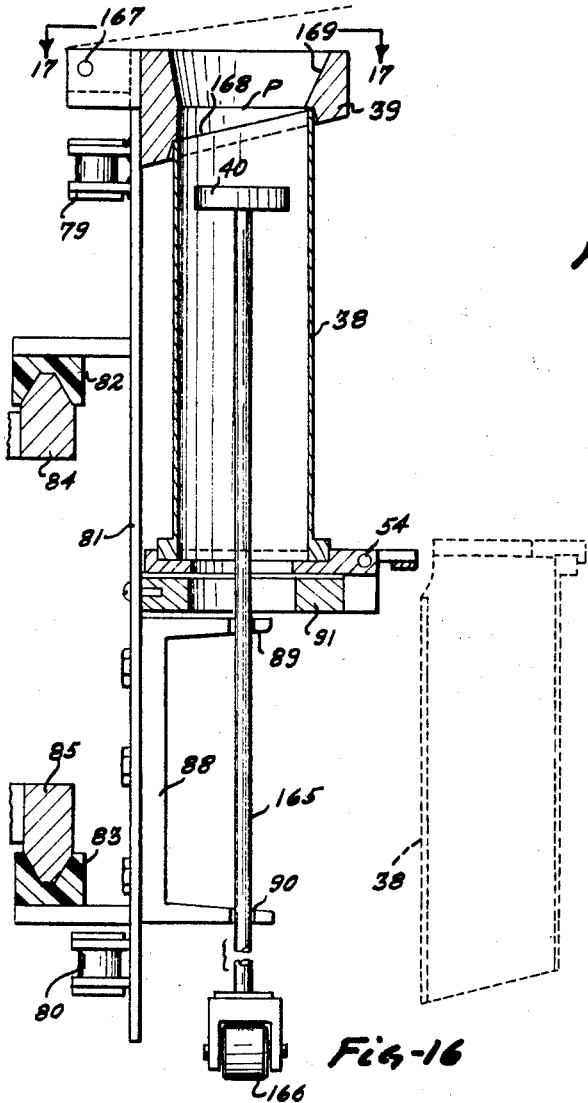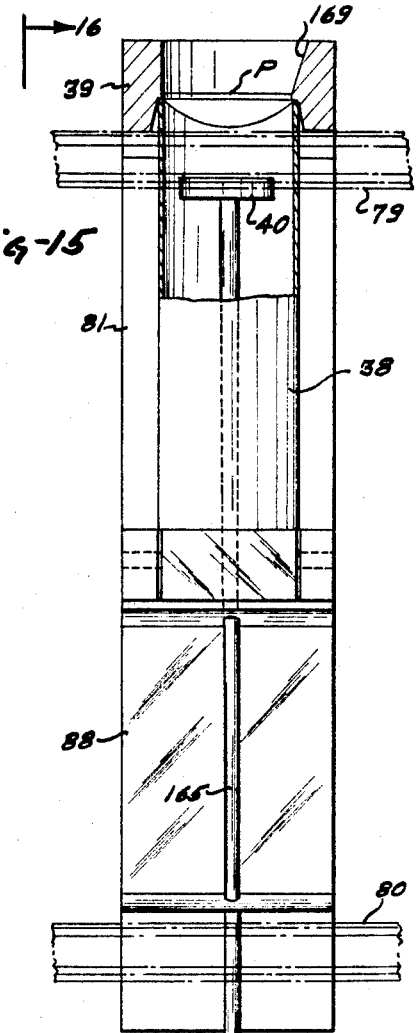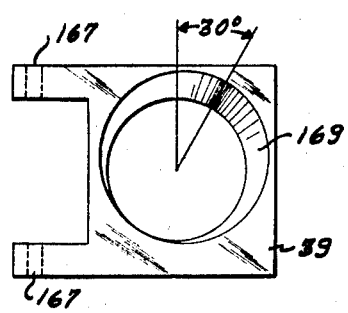

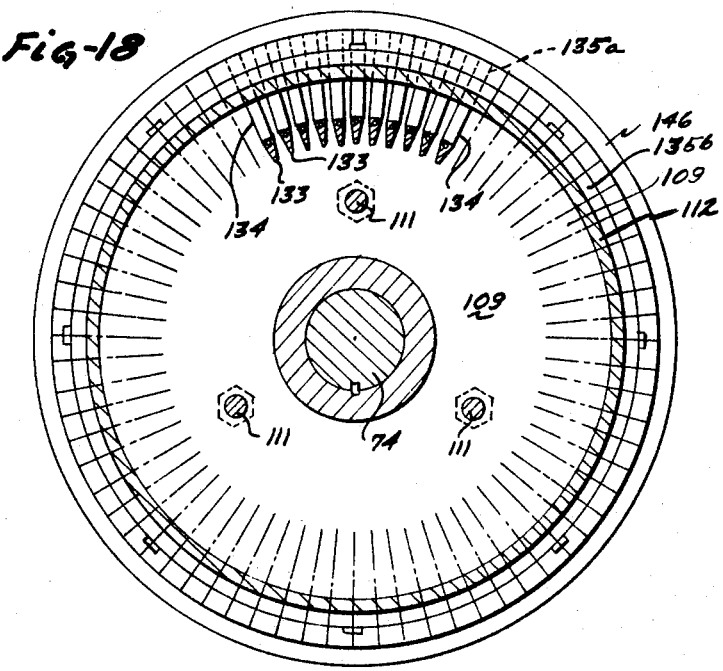
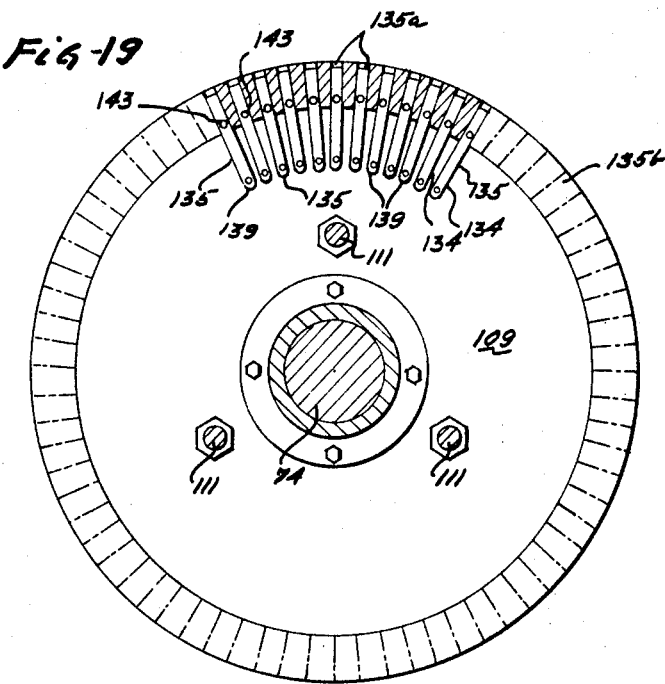

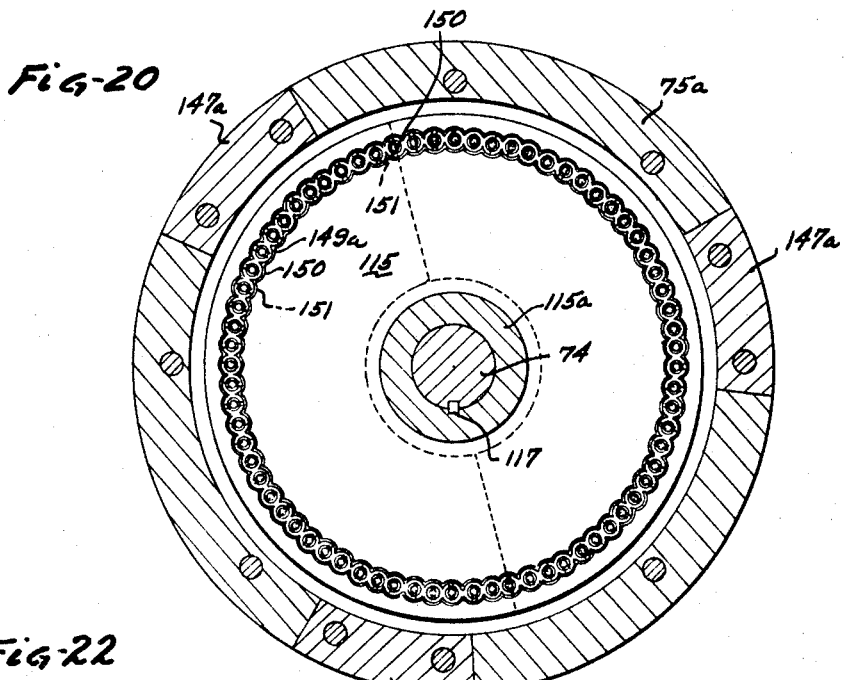
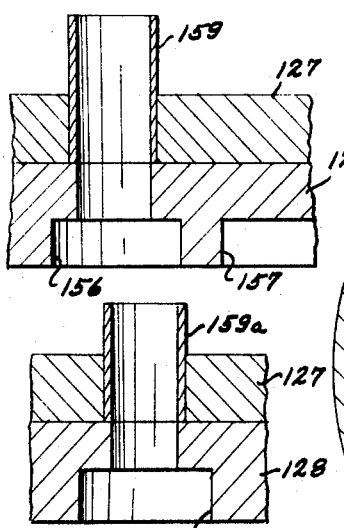
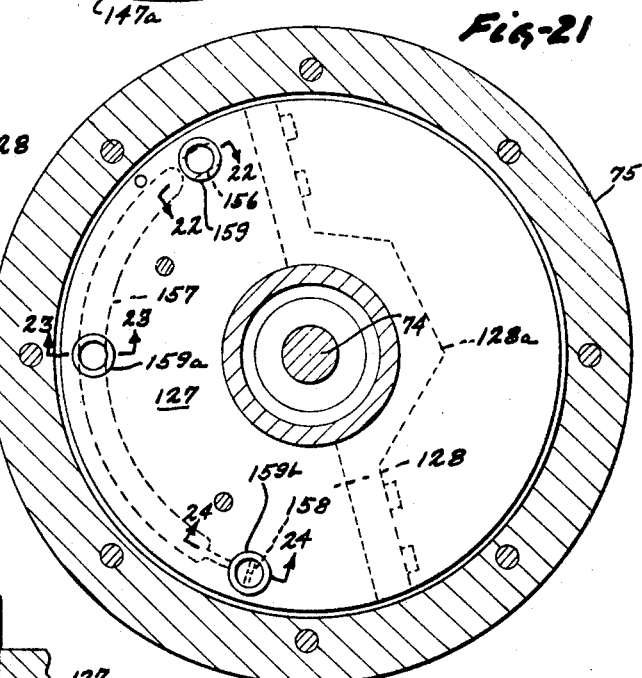
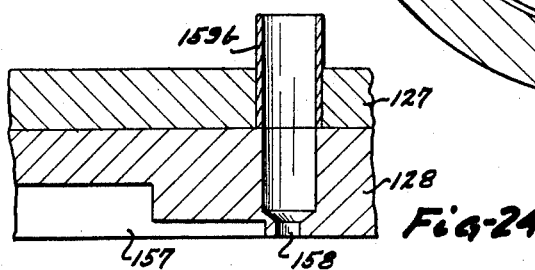

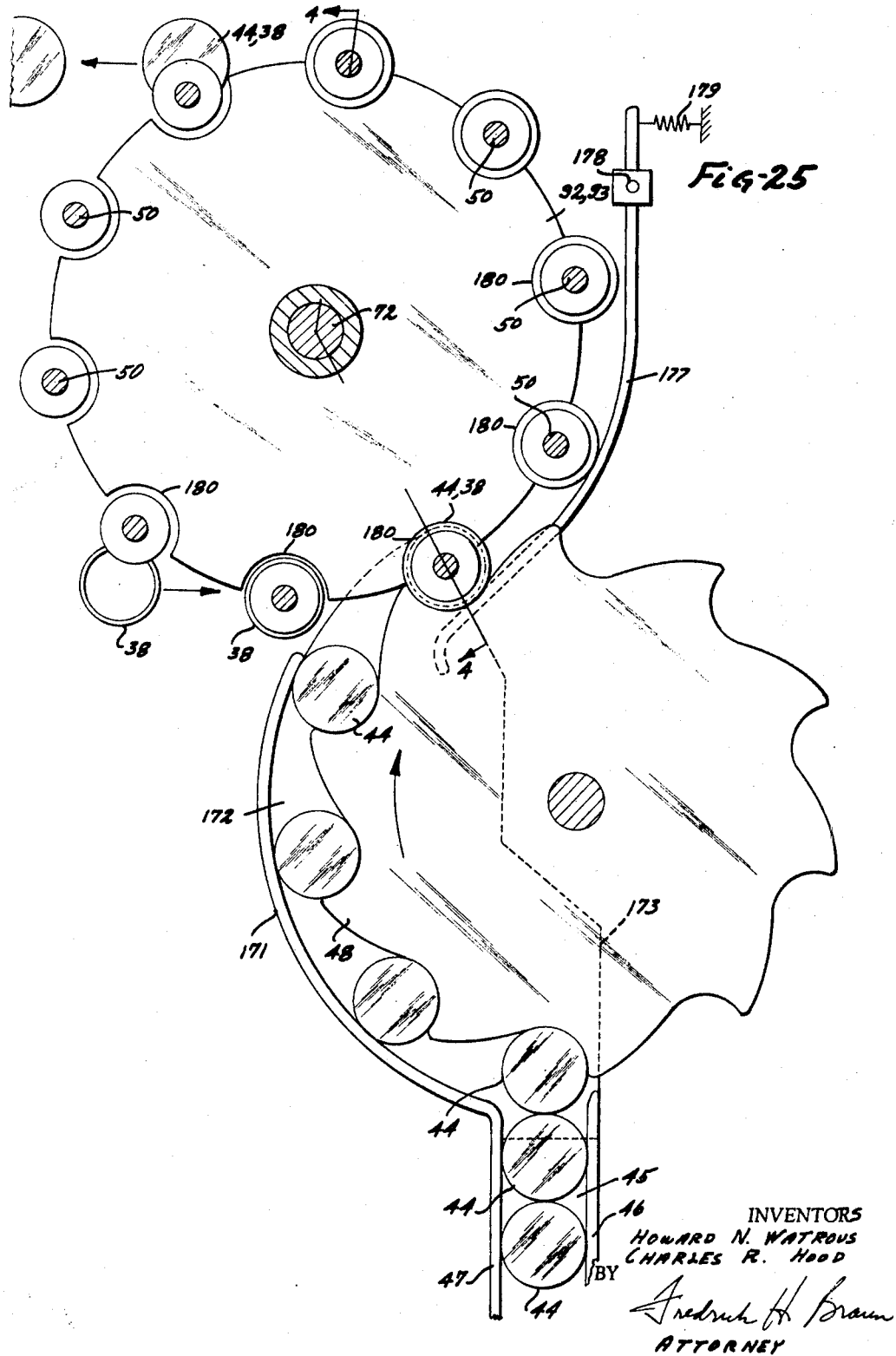

3,273,300
CONTINUOUS DOUGH CUTTING AND
PACKAGING
Howard N. Watrous, Cincinnati, and Charles R. Hood, Springfield Township, Hamilton County, Ohio, assignors to The Procter & Gamble Company, Cincinnati, Ohio, a corporation of Ohio
Filed Aug. 7, 1963, Ser. No. 300,431
22 Claims. (Cl. 53—23)

This invention relates to a machine and method for continuously forming and packing blanks of dough, particularly blanks of prepared dough such as biscuit dough which is packaged for transportation under refrigeration and ultimate sale to consumers in a ready-to-bake condition.

Numerous machines have been developed for cutting biscuit dough blanks and stacking them in commercial packages which usually comprise 10 biscuits per container. The containers are thereafter sealed and kept under refrigeration from the time of packaging, during storage, shipment and sale and prior to use by the consumer. All of the known prior dough cutting and packaging machines operate on an intermittent basis or are encumbered with complex, slow moving loading devices which seriously inhibit the capacity of the machine. In fact, there is not a single commercial machine available which will continuously cut dough and continuously fill biscuit cans at rates approaching 200 cans per minute. This is all principally caused by the disadvantages enumerated above as well as other structural deficiencies and method faults which have resulted in comparatively low capacities in the past.

In the above paragraphs, the terms "dough blanks" and "biscuit dough blanks" have been used more or less interchangeably. It is to be understood, however, that the machine and method described herein are capable of cutting and loading containers with virtually any type of dough such as biscuit dough blanks, doughnut dough blanks, cookie dough blanks and the like. Purely for simplicity and convenience, the machine and method as hereinafter described and claimed will make reference only to biscuit dough but this is not to be construed as placing a limitation on the present invention.

An object of the present invention is the provision of a machine and method for continuously cutting biscuit dough blanks and packaging them into conventional commercial containers. In so doing, it is an object of the invention to increase the speed of this type of cutting and packaging operation to at least 300 containers per minute when handling biscuits of conventional commercial size and packaging them 10 per container which is the usual number merchandised by most commercial brands.

Another object of the invention is to devise a machine and method of the character heretofore described which is operated contiuously at the higher speeds previously mentioned and yet produces a neat stack of biscuits within each container by providing means to eliminate tumbling action of the biscuits as they are deposited in each container.

A further object of the invention is to continuously cut a sheet of dough into a plurality of biscuit blanks and deposit them successively into a series of intermediate containers which move continuously and in timed relation beneath the cutter mechanism.

Still a further object of the invention is the provision of means for receiving empty commercial biscuit containers and transferring the biscuits from intermediate containers which move continuously under the biscuit cutter so that a complete stack of biscuits from the intermediate containers is deposited into successive commercial containers without interruption whereby the commercial containers are discharged in filled condition prior to the final operation of seaming the tops thereon.

The nature and substance of the invention can be briefly summarized as comprising a machine and method for forming and packaging blanks of biscuit dough including a frame, a cylindrical cutter head mounted for rotation on the frame and a plurality of dough cutters on the surface of the cutter head, said dough cutters being arranged in helical rows with each dough cutter preferably being in the shape of a hexagon. A hollow pusher member is mounted radially inwardly of each dough cutter and means are provided for moving the pusher members radially with respect to the rotational axis of the cutter head. The pusher members are provided with a screened face and are connected to a source of subatmospheric pressure for a portion of their cycle and a source of superatmospheric pressure momentarily during the terminal stages of the cycle in order to assist in the removal of the biscuit blanks for deposit in the intermediate containers moving continuously beneath the cutter head.

A strip of dough is contiuously fed to the cutter head and means are provided for continuously forcing the dough into the dough cutters of the cutter head while the pusher members are retracted radially inwardly. Shortly after each biscuit blank is cut, the pusher members are moved outwardly and placed in communication with the subatmospheric pressure source as they contact the biscuit blanks in order to hold the biscuit blanks in the dough cutters as the cutter head rotates.

A series of intermediate containers are moved in continuous fashion beneath the cutter head. A retractable, vertically movable platform is mounted within each intermediate container. Initially, the platform is raised to the top of the intermediate container so that when the first biscuit is discharged from its dough cutter into the intermediate container, it will drop only a short distance equal approximately to its thickness or possibly slightly more. As the intermediate containers continue to move, the individual platforms are lowered by a cam as each successive biscuit is deposited in each intermediate container until it is filled.

As aforesaid, the pusher members are moved radially outwardly shortly after the dough is pressed into the cutters in order for the pusher members to contact the biscuits. The biscuits are held against the pusher members by subatmospheric pressure. As the pusher members approach the moving intermediate containers, they are connected to a source of superatmospheric pressure just before being aligned over the intermediate containers to, in effect, blow each biscuit blank into its respective intermediate container. Further, the dough cutters in the cutter roll are arranged in helical rows so that as the intermediate containers move beneath the cutter roll it receives all of the biscuits discharged from a given helix.

As the filled intermediate containers are continuously moved along, they approach a loading station where commercial containers are telescoped over each successive intermediate container. The commercial containers are supplied with a seamed top and an open bottom during this step of the operation. On further movement of the telescoped containers, the commercial and intermediate containers are inverted and then disengaged whereupon the commercial container receives the full load of biscuits from the intermediate container and is carried off by a take-away conveyor.

While the specification concludes with claims particularly pointing out and distinctly claiming the subject matter regarded as forming the present invention, it is believed the invention will be better understood from the following description taken in connection with the accompanying drawings in which:

FIGURE 1 is a schematic isometric view of a machine that accomplishes the objects of the present invention.

FIGURE 2 is a schematic development of the grid formed by the dough cutters formed on the cutter roll.

FIGURE 3 is an elevation, partially in cross section, taken on the line 3—3 of FIGURE 1 looking toward the cutter roll from the commercial can loader end and showing the drive for numerous elements of the machine.

FIGURE 4 is a cross section which has been partially broken away taken on the line 4—4 of FIGURE 25 showing the details of the mechanism by which the commercial containers are telescoped over the intermediate containers.

FIGURE 5 is an elevation taken on the line 5—5 of FIGURE 1 showing the drive for the dough conveyor belt and the support for the intermediate containers. The view is partially broken away to show the manner in which the dough is forced into the dough cutters on the cutter roll and thereafter discharged by the pusher members into the moving intermediate containers.

FIGURE 6 is a longitudinal cross section of the cutter roll assembly taken on the line 6—6 of FIGURE 5.

FIGURE 7 is a cross section of the cutter roll assembly transversely through its support shaft taken on the line 7—7 of FIGURE 6 showing the operation of the pusher members and the means for actuating same. A portion of the pressure roll and the dough entering the cutter roll are also shown.

FIGURE 8 is an isometric view in detail showing one of the several air tubes used to support and move the pusher members.

FIGURE 9 is a view looking toward the cutter roll assembly which has been broken away to show a cutter bar member and portions of other cutter bar members which make up the dough cutter assembly on the cutter roll. The view also shows the pusher members centrally within each dough cutter. This view is a development of the plan of this assembly in order to more clearly show the manner in which the cutter bars may be nested to form hexagon shaped dough cutters and how they can be formed into helical patterns.

FIGURE 10 is a cross section taken on the line 10—10 of FIGURE 9 showing a section of the cutter bar.

FIGURE 11 is a cross section taken on the line 11—11 of FIGURE 9 showing another section of the cutter bar.

FIGURE 12 is a cross section taken on the line 12—12 of FIGURE 9 showing the end elevation of the cutter bar.

FIGURE 13 is a cross section of an individual dough cutter and its pusher member taken on the line 13—13 of FIGURE 6. The view shows the assembly of the pusher member with the air tube when the latter is fully retracted.

FIGURE 14 is a cross section taken on the line 14—14 of FIGURE 13.

FIGURE 15 is an elevation, partially in section, taken on the line 15—15 of FIGURE 3. It illustrates an individual intermediate container including its transition piece and platform. This view also shows the caster support means for the platform.

FIGURE 16 is a view in cross section taken on the line 16—16 of FIGURE 15 showing additional details of the platform, the mounting plate and the mounting plate supports as well as a portion of the chain used to move the mounting plate.

FIGURE 17 is a top view taken on the line 17—17 of FIGURE 16 showing the offset conical bore in the transition piece to compensate for the combined movement of the cutter roll and the intermediate container when the biscuits are discharged and deposited in the intermediate container.

FIGURE 18 is a cross section through the cutter roll assembly taken on the line 18—18 of FIGURE 6 and showing the slots in one end plate of the cutter roll which permit radial movement of the air tubes.

FIGURE 19 is a cross section taken on the line 19—19 of FIGURE 6 showing the other side of the end plate as well as the air tubes which move radially in the slots of the guide rings.

FIGURE 20 is a view taken on the line 20—20 of FIGURE 6 showing the manner of connecting the ends of the flexible hoses leading from the air tubes to a transition member.

FIGURE 21 is a cross section taken on the line 21—21 of FIGURE 6 showing the end frame and the vacuum and pressure slots formed in the fluid feed member.

FIGURE 22 is a cross section of the fluid feed member and back-up plate taken on the line 22—22 of FIGURE 21 showing the short arcuate vacuum opening in section.

FIGURE 23 is a cross section of the fluid feed member and back-up plate taken on the line 23—23 of FIGURE 21 showing the elongated arcuate vacuum oening in section.

FIGURE 24 is a cross section of the fluid feed member and back-up plate taken on the line 24—24 of FIGURE 21 showing the pressure slot in section.

FIGURE 25 is a schematic plan view showing the star wheel for feeding the commercial cans and moving them into position to be telescoped with the intermediate containers.

SUMMARY OF MACHINE OPERATION

As previously indicated, FIGURE 1 illustrates, schematically, a machine for continuously cutting a sheet of biscuit dough into a plurality of individual biscuits and depositing them into a series of moving intermediate containers. The intermediate containers are filled whereupon commercial containers are telescoped over the intermediate containers which are later inverted and discharged on a take-away conveyor.

For a further description of the machine and its mode of operation reference is again made to FIGURE 1 wherein the machine is essentially divided into a cutting and loading station 30, a commercial container loading station 31 at one end and a container inverting and removal station 32 at the other end. The essential elements of the cutting and loading station 30 include a cutter roll assembly 33, a pressure roll 34 which is preferably covered with rubber or some other resilient material and a dough conveyor belt 35. The biscuit dough 36 is fed into the nip between the cutter roll 33 and the pressure roll 34 where the dough is cut into a plurality of individual biscuits by the cutter roll 33 rotating in the direction of the arrow 37.

Intermediate containers 38 are moved continuously in a circuitous path as illustrated diagrammatically in FIGURE 1. A pivoted transition piece 39 overlies each intermediate container 38 as it moves under the cutter roll assembly 33 to receive a full load of biscuits. For convenience and clarity of illustration, some of the intermediate containers 38 and the transition pieces 39 are illustrated in detail while others are only shown diagrammatically so that the machine is shown complete with all of these parts. The need to show each of these parts in full detail is not necessary in FIGURE 1 for a full and complete general understanding of the machine. The intermediate containers 38 are mounted for movement in a circuitous path by a pair of endless chains and a supporting structure which is hereinafter more fully described.

A platform 40 supported by a rod 165 is mounted for vertical movement within each intermediate container 38 and is moved upwardly by the stepped cam 41 acting on the rod 165 as the intermediate containers 38 approach the cutter roll assembly 33. As each biscuit blank is discharged from the cutter roll into each successive moving container 38, the platform 40 is lowered successively by the notches 41a, 41b, etc., in the stepped cam 41. Each notch lowers the platform 40 a distance about equal to the thickness of one biscuit blank.

A rail 43 is provided beyond the cutter roll 33 to pivot the transition pieces 39 out of their receiving position after the intermediate containers pass under the cutter roll assembly 33 where they are filled with biscuits.

The filled intermediate containers 38 are then ready to receive the commercial containers 44 at the container loading station 31. The containers 44 have been closed at the top and are open at the bottom. An infeed belt 45 carries the commercial containers 44 forward between the guides 46 and 47 until the forward one of the containers 44 is engaged by the star wheel 48 and moved into position above one of the filled intermediate containers 38. A series of pushers 50 move in a circuitous path as indicated schematically and their vertical movement is controlled by the cam track 51. As each successive commercial container 44 moves into place above an intermediate container 38 it is pushed downwardly into telescoped relation therewith by a pusher 50 in response to the action of the cam 51.

The combination of the commercial container 44 telescoped with the intermediate container 38 is then conveyed to the container inverting and removal station 32 by the endless chains (not shown in FIGURE 1 but described in detail hereinafter).

At the container inverting and removal station, the intermediate containers 38 with the commercial containers 44 telescoped thereover are engaged by a pair of rails 52 and 53 and pivoted around the point 54 until both the intermediate container 38 and the commercial container 44 are inverted on arriving at the removal belts 55, 56 and the support slide 57. The removal belts 55 and 56 are aligned on either side of the intermediate containers 38. The belts 55 and 56 as well as the support slide 57 commercial containers 44 and slope downwardly with respect to the horizontal movement of the endless chains which support and carry the intermediate containers 38. Thus, when the belts 55 and 56 engage opposite sides of the body of a commercial container 44, they move it downwardly out of telescoping relationship with the intermediate container 38 as the commercial container is moved forward and down the slide 57 (which is vertically aligned with the path of travel of the intermediate containers 38 and the commercial containers 44) so that each commercial container 44 is completely disengaged from the intermediate container 38.

As the commercial container 44 is lowered, the stack of biscuits resting on the seamed cover of the commercial container supports the stack of biscuits to permit removal and transfer of the stack from the intermediate container 38 into the commercial container 44. The biscuit blanks are sufficiently floured and are somewhat smaller than the bores of the intermediate containers 38 so that frictional effects are negligible as the stack is removed by gravity from each intermediate container 38 to a commercial container 44. The transfer of the stack of biscuits is accomplished without tumbling of any biscuits in the stack. The commercial container is then deposited on the takeaway conveyor 58 and carried off to a conventional apparatus for seaming the other cover on the container 44. As the inverted intermediate container 38 continues to move, it is engaged by the guide rail 59 which restores it to its original position by causing it to pivot around the point 54 prior to again moving under the cutter roll 33. Similarly, the guide rail 60 returns each transition piece 39 to its original position so that each intermediate container 38 is ready to repeat its cycle through the cutting and loading station 30. The entire operation of all moving parts mentioned heretofore is continuous. The machine will now be explained in greater detail.

MACHINE DRIVE

The drive for the machine is best shown in FIGURE 3. It is composed of a motive power source such as an electric motor 61 mounted on the support plate 62 which in turn is fixed to the main frame 63 at the cutting and loading station 30. The motor 61 is drivingly connected to a speed reducer 64 which has a main drive sprocket 65 projecting therefrom as illustrated. A drive chain 66 runs over the main drive sprocket 65, as well as the sprockets 67, 68, 69 and 70. The sprocket 67 is connected to a conventional right angle drive mechanism 71 which rotates the shaft 72. The sprocket 68 is attached to a conventional chain tightener 73. The sprocket 69 is a simple idler sprocket which is mounted on the frame of the machine and the sprocket 70 is attached to the shaft 74 which is mounted in the end frame 75 supporting one end of the entire cutter roll assembly 33.

The shaft 72 projects upwardly and drives the entire intermediate container conveying system and its associated elements. The shaft 72 is supported by the bearing assembly 76. The shaft 72 has upper and lower main drive sprockets 77 and 78 attached thereto. The upper and lower drive sprockets 77 and 78 engage the upper endless chain 79 and the lower endless chain 80, respectively. A plurality of mounting plates 81 (see also FIGURE 1) are attached to the chains 79 and 80. An individual mounting plate 81 is provided for each intermediate container 38. Support lugs 82 and 83 project from each of the mounting plates 81 and engage the stationary supports 84, 85, 86 and 87 which run the entire length of the straight path of travel of the mounting plates in order to support them and to maintain the intermediate containers 38 in proper alignment. A platform bearing mount 88 (see also FIGURE 16) is attached to each of the mounting plates 81 and is provided with bearings 89 and 90. Each platform 40 projects through the mounting plate base 91 (see also FIGURE 1) and is guided in the bearings 89 and 90 as it moves upwardly and/or downwardly by the stepped cam 41. The shaft 72 also drives the commercial container guide wheels 92 and 93 at the container loading station 31 as well as the pusher guide wheels 94 and 95 which guide the pushers 50 previously described in connection with FIGURE 1.

FIGURE 3 also illustrates the frame extension 96 which supports the dough conveyor belt 35. In addition, the pressure roll 34 is shown in operative position supported by the arm 97 which is pivoted on the frame extension 96 around the shaft 97a. The pressure roll 34 is forced against the cutter roll assembly by the fluid actuated cylinder 98.

Going now to FIGURE 5, the remaining portion of the machine drive is illustrated. A sprocket 99 is attached to the shaft 74 and drives the input sprocket 100 to a commercial variable speed drive unit 101. The output sprocket 102 from the variable speed drive unit 101 drives a sprocket 103 by means of the chain 104. A drive pulley 105 is mounted on a common shaft 105a with the sprocket 103 and drives the dough conveyor belt 35 which travels over the idler pulley 106, the adjustable pulley 107, and the nose bar 108. Thus, the dough conveyor belt 35 is driven in timed relation to the rotation of the cutter roll assembly 33 and the movement of the intermediate containers 38.

CUTTER ROLL ASSEMBLY

The cross section of the cutter roll assembly 33 is best illustrated in FIGURE 6. It is mounted on the central shaft 74 and its structure includes end plates 109 and 110 which are held in assembled relation by the tie rods 111. The end plates 109 and 110 are keyed to the shaft 74 as at 109a and 110a. The cutter roll cylinder element 112 is secured to the end plates 109 and 110. The biscuit dough cutter elements, which will be described in greater detail hereinafter, are mounted around the periphery of the cutter roll cylinder 112.

A spacer 113 is secured to the end plate 109 and has an inwardly projecting lip 114 as illustrated. The transition members 115 and 116 are keyed as at 117 and 118, respectively, to opposite ends of the shaft 74.

End frames 75 and 75a are stationarily secured to the main frame 63 as previously indicated (see FIGURE 3 for an illustration of the manner in which the end frame 75 is supported on the main frame 63; the end frame 75a is similarly supported). The end frame 75a has a main bearing 119 mounted therein as shown and the end frame 75 has a main bearing 120 mounted therein in similar fashion. The main bearings 119 and 120 are respectively secured by the bearing caps 121 and 122. Conventional seals 123, 124, 125 and 126 are provided to prevent leakage of lubricant from the bearings.

A back-up plate 127 is forced against a fluid feed member 128 by means of a plurality of spring loaded plungers 129 (only one being illustrated) on the right side of FIGURE 6. Similarly, a back-up plate 130 is forced against a fluid feed member 131 by means of a plurality of spring loaded plungers 132 (only one being illustrated) at the left end in FIGURE 6. The cutter roll assembly 33 is rotated by the main drive previously described while the end frames 75 and 75a maintain the fluid feed members 128 and 131 as well as the back-up plates 127 and 130 stationary by conventional structural means (not shown). The purpose for this will become more evident as the description proceeds.

A plurality of air tubes 133 are mounted for radial movement in the slots 134 cut in each of the end plates 109 and 110. An air tube 133 is shown in greater detail in FIGURE 8. The air tube consists of an elongated bar having end extensions 135 and 136 which are guided for radial movement, respectively, by the radial slots 135a and 136a cut in the air tube guide rings 135b and 136b (FIGURE 6). Nozzles 137 (FIGURE 8) are threaded at 138 and project downwardly in the same plane as the end extensions 135 and 136. Fluid connections 139 and 140 extend at either end of the air tube 133 and are connected by a central passageway 141 extending through the air tube 133. The nozzles 137 each have a branch passageway 142 in communication with the central passageway 141. Cam followers 143 and 144 are provided on the end extensions 135 and 136, respectively.

As best seen in FIGURES 6 and 7, a cam track 145 composed of the elements 146 and 147 is attached to the end frame 75 and spaced therefrom by the blocks 147a. The cam track 145 receives the cam followers 144 extending from the air tube 133. Similarly, at the other end of the cutter roll assembly 33, a cam track 148 composed of elements 146a and 147b receives the cam follower 143 extending from the air tube 133.

Thus, as the cutter roll assembly 33 rotates, the air tubes 133 are moved radially by the cam tracks 145 and 148. The preferred position of the air tubes at any given time in the cycle will be described in greater detail hereinafter. FIGURE 18 illustrates the end plate 109 and the slots 134 provided therein to permit radial movement of the air tubes 133. In addition, FIGURE 18 shows several air tubes 133 in section so that the manner in which they are mounted in the radial slots 134 can be more readily appreciated. FIGURE 19 shows several of the air tubes 133 mounted in assembled position in the slots 134 and 135a. It also shows the cam followers 143 as well as the fluid connections 139.

FLUID FEED MEANS

The fluid connections 139 and 140 on each of the air tubes 133 are connected by means of substantially round flexible hoses 149 (FIGURE 6) to the rotating transition members 115 and 116. Referring now to FIGURE 20, an adapter 149a is secured into the round openings 150 in the transition member 115. One end of each adapter 149a is inserted into a flexible hose 149. The other end of each adapter 149a is substantially rectangular as at 151. The internal area of the adapter 149a from the rectangular opening 151 to its connection with the flexible hose 149 is substantially constant and about equal to the internal cross sectional area of the flexible hoses 149.

The transition members 115 and 116 are rotated and while doing so the radial slots 152 in said members communicate with arcuate openings and slots in the fluid feed members 128 and 131. These latter openings and slots are best shown in FIGURES 7 and 21. FIGURES 7 and 21 illustrate the arcuate openings and the slot in the fluid feed member 128. The arcuate openings and slot in the fluid feed member 131 are similarly disposed at the opposite end of the cutter head. The arcuate openings and slots are oppositely disposed in the fluid feed members 128 and 131 so that the air tubes 133 are exposed simultaneously at both ends to vacuum or air pressure, as the case may be, depending upon the relative rotational position of any particular air tube at any given time. FIGURE 21 also illustrates the fluid feed member sector clamp 128a. A similar sector clamp (not shown) is used to keep the fluid feed member 131 in proper position.

Referring again to FIGURE 21, it will be noted that the fluid feed member 128 is provided with a short arcuate vacuum opening 156 which is also illustrated in cross section in FIGURE 22. An elongated arcuate vacuum opening 157 is also provided as illustrated in FIGURES 22 and 23. In addition, a superatmospheric pressure slot 158 is provided for the admittance of a fluid usually air under pressure.

Similarly, the fluid feed member 131 is provided with a short arcuate vacuum opening 153 (FIGURE 6), an elongated arcuate vacuum opening 154 (FIGURE 5), and a superatmospheric pressure slot 155 (FIGURE 6). Vacuum hose connections 159 (as illustrated in FIGURES 5, 6 and 21) are provided for the short arcuate vacuum openings 153 and 156 in the fluid feed members 131 and 128, respectively. Similarly, vacuum connections 159a (FIGURES 5 and 21) are provided for the elongated arcuate vacuum openings 154 and 157 in the fluid feed members 131 and 128, respectively. Referring still to FIGURES 5, 6 and 21, a pressure connection 159b is provided for the pressure slots 155 and 158. It will be noted that the pressure slots 155 and 158 are slightly offset with respect to the vertical center line of the cutter roll assembly 33. The purpose of this will be more fully explained hereinafter.

CUTTER ROLL PERIPHERAL DOUGH CUTTER ASSEMBLY

As illustrated in FIGURES 6 and 9 the hexagon shaped dough cutters are formed by a series of nesting cutter bars 160. Each cutter bar 160 is the same shape as its adjoining cutter bar so that the cutter bars nest to form a plurality of hexagon shaped dough cutters 161 and dough pockets 161a around the cutter roll assembly. FIGURES 10, 11 and 12 show various sections through an individual cutter bar 160, the details of which will be evident to those skilled in the art. With the cutter bars 160 mounted entirely around the cutter roll cylinder 112, a hexagon grid of dough cutters 161 is formed.

As best illustrated in FIGURE 2, the structure of the individual dough cutters 161 is such that the hexagons nest entirely with one another and form a series of spirally arranged rows of dough cutters 161. This permits filling of the intermediate containers 38 with dough blanks from one entire helical row of dough cutters 161, while both the intermediate containers 38 and the dough cutters 161 are in continuous motion. For example, one intermediate container 38 would be filled with ten biscuit blanks from the ten dough cutters 161 on the center line A shown in FIGURE 2. This is one of the principal factors which permits continuous rotation of the cutter assembly during continuous filling of the intermediate containers. Of course, the number of dough cutters on the center line A can be varied depending on the number of biscuits to be deposited in the intermediate container. Ten biscuits are usually packed in a single container in present day commercial practice.

The pusher members are best illustrated in FIGURES 13 and 14. The pusher member 162 is screwed on the thread 138 at each of the nozzles 137 on each air tube 133 of the assembly. A screen 163 of plastic material is snapped over the pusher member 162. An annular ring 164 is provided around the screen 163 and projects upwardly from the pusher member 162. A plan view of this arrangement is illustrated in FIGURE 14.

INTERMEDIATE CONTAINERS

The details of the intermediate containers and their associated elements are best illustrated in FIGURES 15, 16 and 17. As previously described, each of the intermediate containers 38 is provided with an internal platform 40 which is supported by a rod 165 having a freely rotating caster wheel 166 attached at its lower end. The center line of the caster wheel is somewhat behind the center line of the rod 165 for better tracking of the caster wheel as it is moved along. The transition piece 39 is pivoted at 167 so that it can be swung away from the intermediate container 38 by the rail 43 previously described in connection with FIGURE 1. FIGURE 16 also illustrates the position of the intermediate containers 38 in broken lines when it is pivoted downwardly about the pivot point 54 as when a commercial container 44 is being removed at the take-away station. It will be noted that the top 168 of the intermediate container 38 is at an angle with respect to its central axis, the purpose of this will become clear as the description proceeds. The remaining elements which make up the intermediate containers 38 and their associated elements have been previously described.

FIGURE 17 illustrates one of the critical aspects of the invention. The opening 169 in the transition piece 39 has the shape of a cone segment. It has been found that best results are obtained when the axis of the cone segment is in a vertical plane 30° from the line of motion of the transition piece 39 as illustrated. The vertical plane containing the axis of the cone segment also must pass through the vertical axis of the intermediate container 38. The axis of the cone intersects the axis of the container 38 at the point P shown in FIGURES 15 and 16. The preferred angle between the axis of the intermediate container and the axis of the cone segment is approximately 15° when operating the machine at a filling rate of 300 commercial containers per minute. It is preferred that the included angle of the cone segment be approximately twice the angle between the axis of the intermediate container and the axis of the cone segment. The machine will also operate satisfactorily with the axis of the cone segment at a somewhat different angle depending on the production rates that are to be achieved as will be appreciated by those skilled in the art. The importance of the opening shape in the transition piece 39 is to simultaneously compensate for the rotational movement of the cutter roll assembly 33 and the moving intermediate containers 38 at the moment when each individual biscuit is discharged from the cutter roll by the pusher member 162 and inserted into its intermediate container 38.

Referring again to FIGURE 1, it will be noted that at any given time, only five intermediate containers 38 are beneath the cutter roll assembly 33. This will be better understood by referring to FIGURE 2 since while each intermediate container 38 is filled by a helical row of dough pockets 161a, only five dough cutters 161 (as indicated by the line C) will be in line with the intermediate containers 38 at any given instant while the machine is in operation.

CAN LOADING STATION

The can loading station 31 has already been briefly described previously in connection with the introductory description of overall machine operation. It is illustrated in greater detail in FIGURES 4 and 25. The commercial containers 44 are fed to the machine on the infeed belt 45 whereupon they are engaged individually and moved by the star wheel 48 which is rotated and driven in timed relation to the machine. An arcuate guide 171 prevents dislodgment of the commercial containers 44 from the star wheel 48 (FIGURE 25) and they are prevented from dropping downwardly by a dead plate 172. The inner outline of the dead plate 172 is shown by the broken line 173.

As each container 44 becomes aligned over an intermediate container 38, which has been filled with ten biscuits, a pusher 50 the upper end of which has a cam follower 174 (FIGURE 4) guided by the cam track 51 (FIGURES 1 and 4) moves downwardly through the rotating pusher guide wheels 94 and 95 to telescope the commercial container 44 over the intermediate container 38. As noted in FIGURE 4, the intermediate container 38 is tilted slightly during the telescoping operation so that its angled top 168 will facilitate initial engagement with the downward moving container 44. The intermediate container 38 is tilted outwardly immediately after initial engagement with the lower end of the commercial container 44 to prevent interference between the containers as the telescoping step is completed.

As best seen in FIGURE 25, the commercial containers 44 are removed from the star wheel 48 as they pass over the edge 173 of the dead plate 172 by the guide 177 which is pivoted at 178 and held against the containers 44 by the tension spring 179. The commercial containers 44 are thus caused to engage the notches 180 formed in the commercial container guide wheels 92 and 93. Alignment is maintained after engagement with and movement by the commercial container guide wheels 92 and 93 by the telescoping engagement of the commercial containers 44 with the intermediate containers 38.

CAN INVERTING AND REMOVAL STATION

After the commercial containers 44 have been telescoped over the intermediate containers 38 the entire assembly is conveyed to the other end of the machine. As previously indicated, the intermediate containers with the commercial containers telescoped thereover are then inverted about the pivot point 54 (FIGURES 1 and 16) by the rails 52 and 53 (FIGURE 1). The commercial containers 44 are then engaged by the removal belts 55 and 56 and deposited on the slide 57. The belts 55, 56 and slide 57 are vertically inclined with respect to the horizontal path of travel of the intermediate containers 38. Thus, the belts grasp the commercial containers 44 and slide them downwardly out of telescoping engagement with the intermediate containers 38. As each commercial container 44 is lowered, the stack of biscuits resting on the seamed cover of the commercial container supports the stack of biscuits which are thus removed and transferred by gravity from the intermediate container 38 and into the commercial container 44. Gravity transfer is possible since frictional effects are negligible between the bore of the intermediate containers 38 and the biscuits. This is achieved by flouring the biscuits at the cutter roll and by cutting them to a size that facilitates smooth gravity transfer. The transfer of the stack of biscuits is accomplished without tumbling of any biscuits in the stack as it passes down the slide 57. The filled commercial containers 44 are successively deposited on the take-away conveyor 58.

CUTTER OPERATION AND CONTAINER FILLING

As best seen in FIGURES 1, 5 and 7, the dough sheet 36 is fed forward by the conveyor belt 35 until it enters the nip between the pressure roll 34 and the cutter roll 33. The dough is cut by the dough cutters 161 and forced into the pockets 161a to transform the dough sheet into a plurality of hexagon shaped biscuits B. As the dough is being cut, the air tubes 133 are retracted radially inwardly by the cam tracks 145 and 148. After the cutter roll 33 has rotated slightly beyond the nip between the rolls 33 and 34, and the biscuits B have been individually formed in the cutter pockets 161a, the air tubes 133 are moved radially outwardly by the cam tracks 145 and 148 so that the annular rings 164 on the pusher members 162 make contact with each newly cut biscuit B.

At about the same time, the openings 152 in the transition pieces for the particular air tube become aligned with the short arcuate vacuum openings 153 and 156 so that an initial vacuum is applied to each of the pusher members 162 through the screen 163 to draw the biscuits B against the pusher members 162. The initial vacuum varies considerably at the moment of initial contact with the biscuits. For that reason, the short arcuate vacuum opening is used so that the vacuum can be stabilized after the air tubes 133 are rotated to a position where the openings 152 in the transition pieces communicate with the elongated arcuate vacuum openings 154 and 157.

The biscuits B are rotated through a substantial arc in partially ejected position due to the shape of the cam tracks 145 and 148 (see FIGURE 7). Just prior to coming into alignment with the transition piece 39 over a given intermediate container 38, the openings 152 in the transition pieces 115 and 116 for the particular air tube 133 are rotated beyond the elongated arcuate vacuum openings 154 and 157. Shortly thereafter, they communicate with the pressure slots 155 and 158. At that time, a momentary superatmospheric fluid pressure charge through the slots 155 and 158, which can be air under pressure or any other fluid, positively removes the biscuits B from the pusher members 162 just before they come into vertical alignment with the intermediate containers 38.

As illustrated in FIGURE 7, the platform 40 is shown supporting a biscuit and has been lowered one step by the cam 41 (FIGURE 1) at the time when the second biscuit B is being discharged so that the opening 169 in the transition piece 39 properly guides the biscuit B into the moving intermediate container 38. Simultaneously, the platform 40 is in proper position so that the top of the first biscuit B prevents the second biscuit B from tumbling as it drops into the intermediate container 38.

In this connection, FIGURE 6 is also of interest in that it shows five intermediate containers 38 moving along beneath the cutter roll assembly 33 and it will be noted that the first of these (on the extreme left) is in position to receive its second biscuit; the second of these is in position to receive its fourth biscuit; the third its sixth; the fourth its eighth; and the last its tenth. Thus, the last intermediate container 38 in FIGURE 6 (on the extreme right) is illustrated as it would appear in filled condition although the biscuits are not shown in any of the intermediate containers simply for clarity of illustration.

The odd numbered biscuits (1, 3, 5, 7 and 9) would have been received by these intermediate containers 38 at a position intermediate the positions illustrated on the drawing, as will be appreciated by referring to the schematic development of the grid formed by the dough cutters 161 shown in FIGURE 2. Only five intermediate containers 38 are under the cutter roll 33 at any one time but each successive intermediate container 38 receives a total of ten biscuits from a helical row of dough cutters 161 on the cutter roll 33.

After the biscuits B have been discharged, the cam tracks 145 and 148 move the air tubes 133 radially inwardly to their fully retracted position (FIGURE 7). They are then ready for the next rotative cycle of the cutter head assembly 33 which, as previously stated, rotates continuously in timed relation to the continuous movement of the intermediate containers 38. The combination of continuously moving elements as heretofore described forms the basis for obtaining an apparatus and method which permits the cutting and filling of commercial biscuit containers at rates in excess of 300 containers per minute, a rate which has never before been approached in this industry.

While the dough cutters have been described herein as being of a nesting hexagon configuration, this is a preferred shape as it minimizes scrap and yet produces a shape which fits well into a cylindrical can. It is to be understood, however, that other nesting (e.g., a rectangular shape) or even non-nesting (e.g., a round shape) configurations can be used and might even be preferred in some instances. where a non-nesting configuration is used, it will, of course, produce surplus material that would be recycled.

While particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed as new is:

1. A machine for forming and packing blanks of dough comprising the combination of a frame, a cylindrical cutter head mounted for rotation on said frame, a plurality of dough cutters on the surface of said cutter head, means for feeding a sheet of dough to said cutter head, means for forcing said sheet of dough into said dough cutters to divide said dough sheet into a plurality of dough blanks, a plurality of hollow dough blank receiving means moving beneath said cutter head for receiving a plurality of dough blanks in a stack, and means for continuously driving said dough feeding means, said cylindrical cutter head and said hollow dough blank receiving means in timed relation to continuously fill the hollow dough blank receiving means with a plurality of dough blanks as said latter means moves beneath the rotating cutter head.

2. A machine for forming and packing blanks of dough comprising the combination of a frame, a cylindrical cutter head mounted for rotation on said frame, a plurality of dough cutters on the surface of said cutter head, means for feeding a sheet of dough to said cutter head, means for forcing said sheet of dough into said dough cutters to divide said dough sheet into a plurality of dough blanks, a plurality of hollow dough blank receiving means moving beneath said cutter head for receiving a plurality of dough blanks in a stack, means for ejecting said dough blanks from said cutter head into said hollow dough blank receiving means, and means for continuously driving said dough feeding means, said cylindrical cutter head and said hollow dough blank receiving means in timed relation to continuously fill the hollow dough blank receiving means with a plurality of dough blanks as said latter means moves beneath the rotating cutter head.

3. A machine as claimed in claim 2 wherein said hollow dough blank receiving means comprises a plurality of hollow containers moving continuously in timed relation to said cutter head to receive said dough blanks in the form of a stack composed of a plurality of dough blanks.

4. A machine as claimed in claim 3 including a vertically movable platform within said hollow containers and means for controlling the vertical movement thereof.

5. A machine as claimed in claim 4 wherein the means for controlling the vertical movement of said platforms includes a cam, said cam being shaped to lower each platform a distance about equal to the thickness of a dough blank as each successive dough blank is deposited in its hollow container.

6. A machine for forming and packing blanks of dough comprising the combination of a frame, a cylindrical cutter head mounted for rotation on said frame, a plurality of dough cutters on the surface of said cutter head, each of said dough cutters having a hexagonal periphery, means for feeding a sheet of dough to said cutter head, means for forcing said sheet of dough into said dough cutters to divide said dough sheet into a plurality of dough blanks, a plurality of hollow dough blank receiving means moving beneath said cutter head for receiving a plurality of dough blanks in a stack, and means for continuously driving said cutter head, said dough feeding means and said hollow dough blank receiving means in timed relation to fill the latter with a plurality of dough blanks as they move continuously beneath the rotating cutter head.

7. A machine as claimed in claim 6 including means in said cutter head for ejecting said dough blanks into said dough blank receiving means.

8. A machine as claimed in claim 6 wherein said hexagonal dough cutters are arranged in adjoining spirals around the periphery of said cutter head.

9. A machine as claimed in claim 8 wherein said means for forcing said dough into said dough cutters comprises a roller having a resilient surface and means for forcing said roller against said cutter head.

10. A machine for forming and packing blanks of dough comprising the combination of a frame, a cylindrical cutter head mounted for rotation on said frame, a plurality of dough cutters on the surface of said cutter head, each of said dough cutters forming a dough pocket, means for feeding a sheet of dough to said cutter head, means for forcing said sheet of dough into said cutters to divide said dough sheet into a plurality of dough blanks, dough blank receiving means moving beneath said cutter head, means including a pusher member mounted for radial movement within each of said dough pockets, each of said pusher members having an opening in its outer surface, means connecting each of said pusher members to a source of vacuum after said dough blanks are cut so that the pusher members hold the dough blanks within their respective pockets, means for disconnecting said vacuum source to said pusher members prior to ejection of said dough blanks, means for thereafter connecting each pusher member to a source of superatmospheric fluid pressure just prior to the time when said dough pocket comes into alignment over said dough blank receiving means whereby said dough blank is ejected into said moving receiving means from said continuously rotating cutter head.

11. A machine as claimed in claim 10 wherein said dough blank receiving means comprises a plurality of cylindrical intermediate containers moving continuously in timed relation to said cutter head to receive said dough blanks in the form of a stack containing a plurality of dough blanks.

12. A machine as claimed in claim 11 including a vertically movable platform within said cylindrical intermediate containers and means for controlling the vertical movement thereof.

13. A machine as claimed in claim 12 wherein the means for controlling the vertical movement of said platforms includes a cam, said cam being designed to lower each platform a distance about equal to the thickness of a biscuit blank as each successive biscuit blank is deposited in the cylindrical intermediate container.

14. A machine as claimed in claim 11 including commercial container infeed means and means for telescoping said commercial containers over said cylindrical intermediate containers.

15. A machine as claimed in claim 14 including means for inverting said telescoped commercial containers and said cylindrical intermediate containers and means for removing said commercial containers from telescoping relationship with said intermediate containers so that the dough blanks are transferred by gravity from the intermediate containers to the commercial containers.

16. A machine for forming and packing blanks of dough comprising the combination of a frame, a cylindrical cutter head mounted for rotation on said frame, a plurality of dough cutters forming a plurality of dough pockets on the surface of said cutter, said dough pockets being arranged in helical rows around said cutter head, a hollow pusher member mounted within each dough pocket, means for moving said pusher members radially with respect to the rotational axis of said cutter head, at least one aperture in the face of each of said pusher members beyond said hollow, means for applying subatmospheric pressure to the hollows of said pusher members during a portion of their rotative cycle, means for continuously feeding a strip of dough to the cutter head, means on said frame for continuously forcing the dough into dough pockets on said cutter head to form a plurality of dough blanks while said pusher members are retracted radially inwardly, said pusher members being in communication with said subatmospheric pressure means to hold the dough blanks in the dough pockets during a portion of the rotative cycle of said cutter head, a plurality of intermediate containers moving continuously under said cutter head, a vertically movable platform in each of said intermediate containers, means for lowering the platforms a distance about equal to the thickness of a dough blank as each successive dough blank is inserted from said cutter head, means for moving said pusher members outwardly as the cutter member rotates thereby pushing each dough blank from its dough pocket, means for removing the dough blanks from said pusher members as they approach alignment with the intermediate containers, whereby the first dough pocket in each of said helical rows deposits the first dough blank in an intermediate container and the remaining dough blanks are successively inserted from each successive dough pocket in the same helical row while the platform is simultaneously lowered in the intermediate container until the said container is filled.

17. In a machine for forming and packing blanks of dough, a cylindrical intermediate container, a mounting plate for said intermediate container, said intermediate container being pivoted to said mounting plate, a pivoted transition piece over said cylindrical intermediate container, said transition piece having a conical opening the axis of which is offset with respect to the axis of the cylindrical intermediate container.

18. A device as claimed in claim 17 in which the cylindrical intermediate container has its top cut at an angle with respect to its axis in order to initiate reception of a commercial container in telescoped relation.

19. A method of continuously forming and packing blanks of dough comprising the steps of feeding a sheet of dough continuously to a rotating cutter head, cutting dough blanks continuously from said sheet of dough by pressing the dough sheet against the cutter head, depositing the dough blanks so cut into a series of continuously moving hollow containers moving beneath said cutter head until the hollow containers are filled with a plurality of dough blanks.

20. A method of continuously forming and packing blanks of dough comprising the steps of feeding a sheet of dough continuously to a rotating cutter head, cutting dough blanks continuously from said sheet of dough by pressing the dough sheet against the cutter head, depositing the dough blanks so cut into a series of continuously moving hollow intermediate containers moving beneath said cutter head until each intermediate container is filled with a plurality of dough blanks, and transferring the dough blanks by gravity from each intermediate container into a commercial container.

21. A method of continuously forming and packing blanks of dough comprising the steps of feeding a sheet of dough continuously to a rotating cutter head, cutting dough blanks continuously from said sheet of dough by pressing the dough sheet against the cutter head, ejecting the dough blanks from the cutter by fluid pressure to deposit them into a series of continuously moving intermediate containers moving beneath said cutter head until each intermediate container is filled with a plurality of dough blanks, and transferring the dough blanks by gravity from said intermediate containers to commercial containers.

22. A method of continuously forming and packing blanks of dough comprising the steps of feeding a sheet of dough continuously to a rotating cutter head having a plurality of dough cutters on its surface, forcing the sheet of dough against the dough cutters to form a plurality of dough blanks, holding the dough blanks in dough pockets formed by the dough cutters by means of vacuum, thereafter ejecting the dough blanks from the pockets by superatmospheric fluid pressure to deposit them into a series of continuously moving intermediate containers moving beneath said cutter head to fill each intermediate container with a plurality of dough blanks.

No references cited.

GRANVILLE Y. CUSTER, JR., *Primary Examiner.*